May 27, 1958 J. C. SMITH 2,836,045
DRY CLEANING APPARATUS
Filed June 4, 1954 4 Sheets-Sheet 1

INVENTOR.
Jack C. Smith,
BY Paul & Paul
ATTORNEYS.

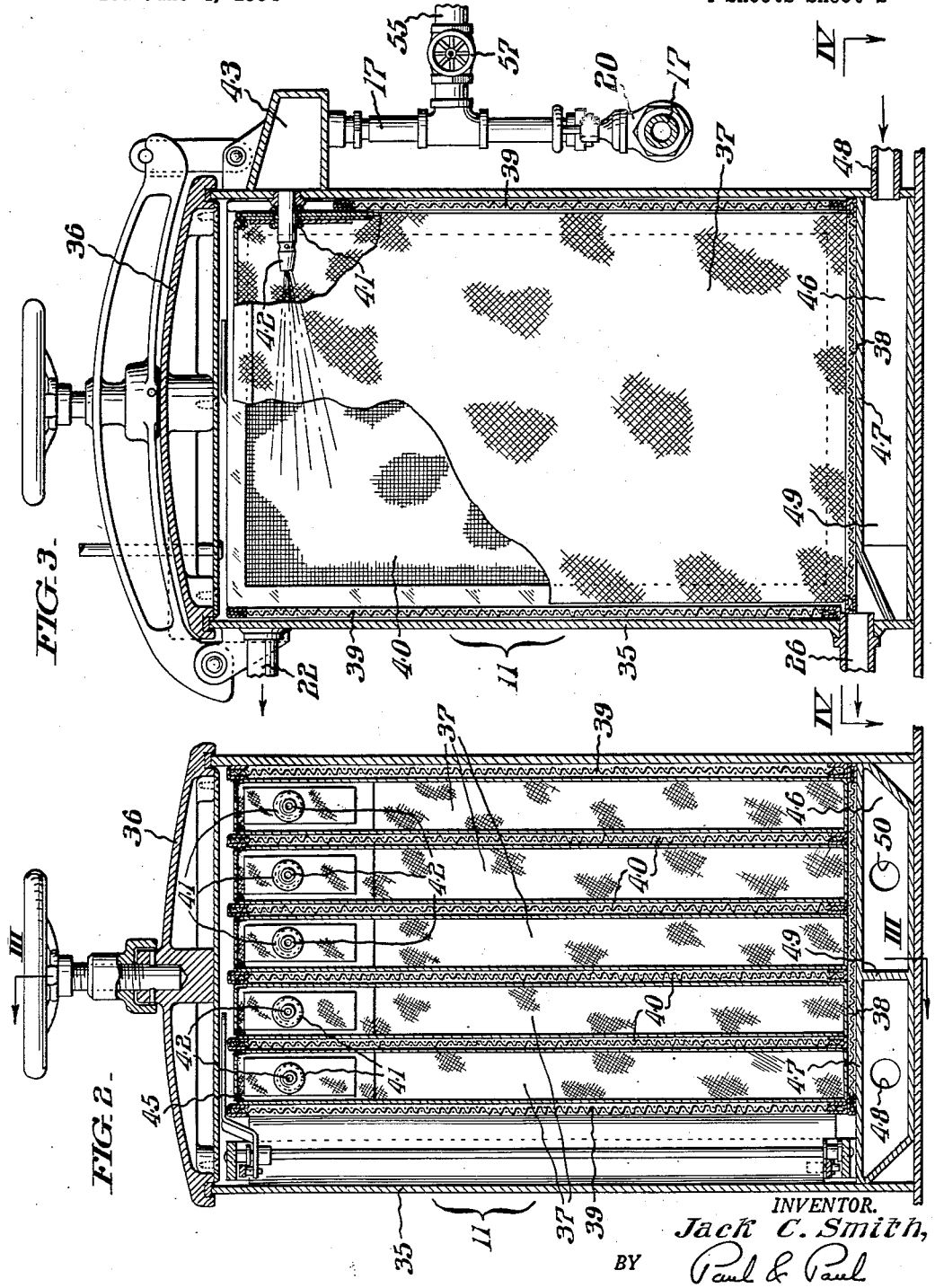

May 27, 1958  J. C. SMITH  2,836,045
DRY CLEANING APPARATUS
Filed June 4, 1954  4 Sheets-Sheet 3
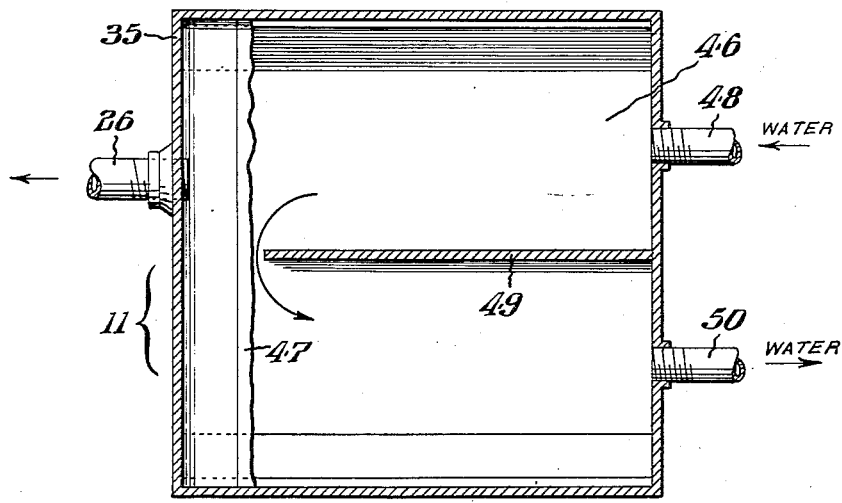
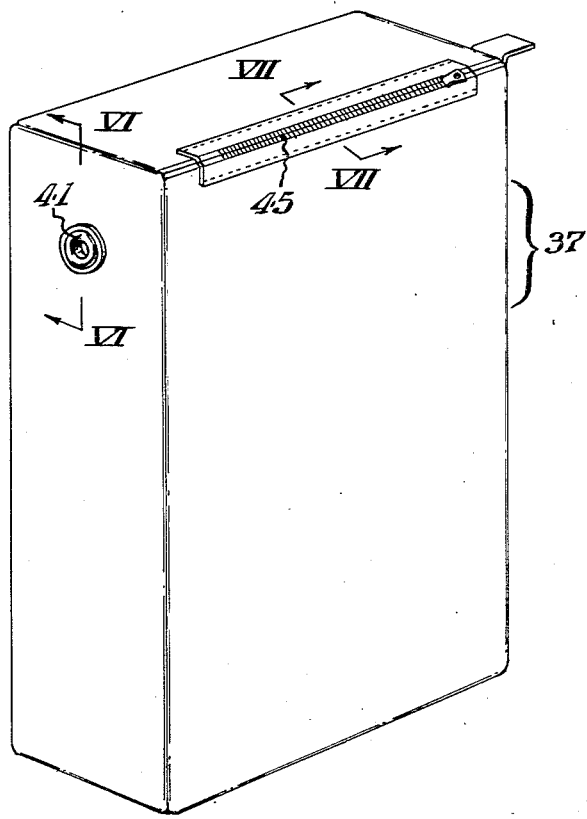
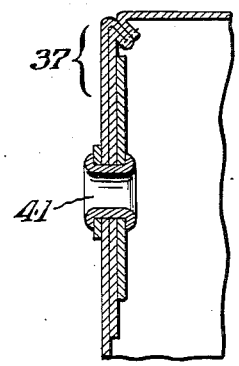
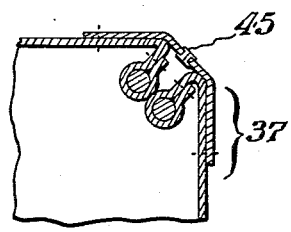
INVENTOR.
Jack C. Smith,
BY Paul & Paul
ATTORNEYS.

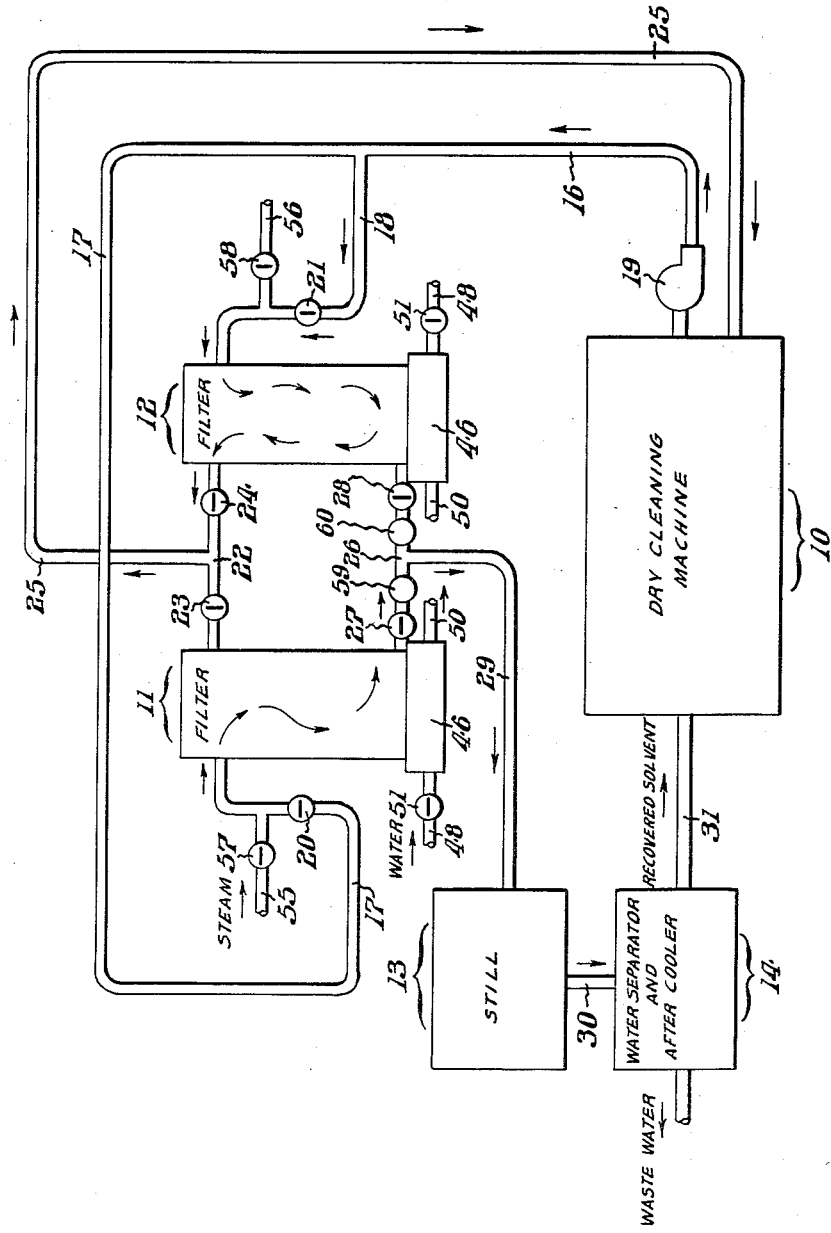

United States Patent Office 2,836,045
Patented May 27, 1958

2,836,045

DRY CLEANING APPARATUS

Jack C. Smith, Detroit, Mich., assignor to Detrex Chemical Industries, Inc., a corporation of Michigan Application June 4, 1954, Serial No. 434,381

4 Claims. (Cl. 68—18)

This invention relates to dry cleaning apparatus, that is to say, to apparatus for cleaning clothes and articles of textile manufacture by treatment with chlorinated hydrocarbon solvents such as perchlorethylene and the like. More particularly, the invention has reference to dry cleaning apparatus of the type disclosed in United States Patent No. 2,574,251 granted to Clarence F. Dinley on November 6, 1951. This apparatus includes a machine in which the material to be cleaned is tumbled about in a rotary drum and is alternately dipped into and raised from the solvent. Selectively usable filter units are provided through which the solvent is passed for removal of dirt, lint and other solid matter, and there is a still to which the solvent is conducted from the idle filter unit for removal of impurities before being returned for re-use in the machine.

Heretofore, with apparatus of this type, it was necessary to remove the filter bags from the filters from time to time and to transfer them to a separate recovery unit for salvaging the entrained solvent. This procedure not only entailed the handling of the heavy solvent saturated bags but idling of the apparatus until the bags were restored, with consequent loss of time which could more profitably be devoted to processing of the garments. At best, only a small portion of the solvent could be recovered in this way. Another and likewise inefficient procedure practiced heretofore, was to place the filter bags in a centrifuge for recovery of the solvent.

The chief aim of my invention is to overcome the drawbacks above mentioned, or in other words, to make possible the complete recovery of the solvent from the dirty filter bags before withdrawing them from the filter units for removal of accumulations of contaminates, without necessitating idling of the apparatus while the bags are reconditioned.

How the foregoing and other important advantages are realized in practice will appear from the following detailed description of the attached drawings, wherein:

Fig. 2 is a view drawn to a larger scale showing one of the filter units in vertical section.

Fig. 3 is likewise a vertical section of the filter unit but taken as indicated by the angled arrows III—III in Fig. 2.

Fig. 4 shows a horizontal section taken as indicated by the angled arrows IV—IV in Fig. 3.

Fig. 5 is a perspective view of one of the filter bags associated with the unit of Figs. 2–4.

Figs. 6 and 7 are fragmentary detail views in section taken as indicated respectively by the angled arrows VI—VI and VII—VII in Fig. 5; and Fig. 8 is a view corresponding to Fig. 1 showing another phase in the operation of the system.

Figure 1:
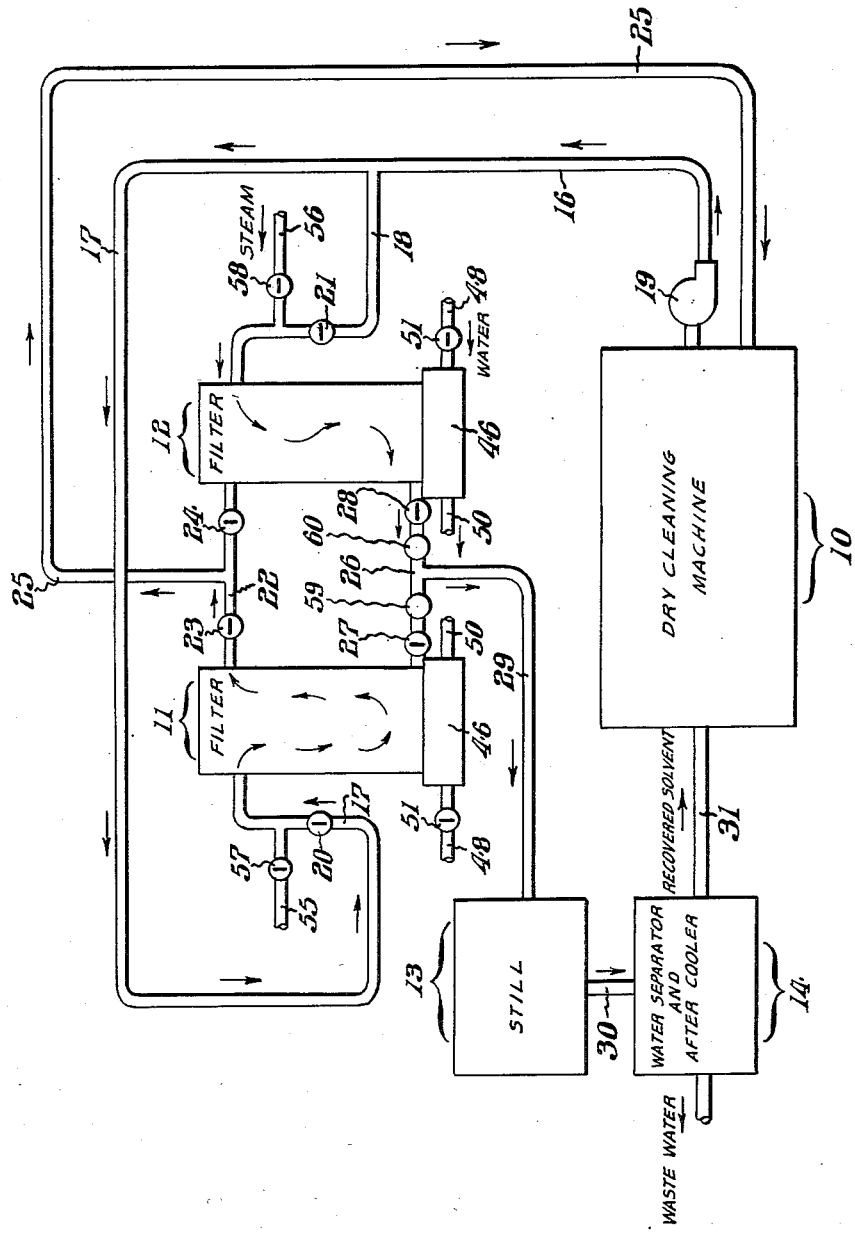
Fig. 1 is a diagrammatic view of a dry cleaning apparatus with a filtering system conveniently embodying my invention.

With more specific reference first to Fig. 1 of these illustrations, the numeral 10 designates a dry cleaning machine which may be of the type disclosed in the Dinley patent hereinbefore referred to. The two associated selectively usable filters are indicated at 11 and 12 respectively, the purification still at 13, and the water separator and after cooler at 14. Leading from the machine is a pipe line 16 with branches 17 and 18 that connect into opposite sides of the filters 11 and 12 at the top. Interposed in the pipe line 16 is a power driven pump 19, and interposed in the branches 17 and 18 are valves 20 and 21. The filters 11 and 12 are connected at the top by an out flow pipe 22 in which valves 23 and 24 are interposed, and connecting into said pipe 22 between said valves is a pipe line 25 which extends back to the machine 10. Extending between the filters 11 and 12 at the bottom is a drain pipe 26 in which are interposed individual drain control valves 27, 28, and leading from said pipe between said valves to the purification still 13, is a pipe 29. By way of a pipe 30, the still 13 is in communication with the water separator and after cooler 14, while the latter is communicative in turn, through a pipe 31, with the dry cleaning machine 10.

The filters 11 and 12 are identical and except as hereinafter particularly pointed out, are of the same construction as those of the Dinley patent, supra, in that each of them comprises, as instanced in Figs. 2 and 3, an upright casing 35 which is rectangular in horizontal section, and which has a removable top cover 36. Arranged side by side within the casing 35 are plural filter bags 37 which may be of canvas, and arranged beneath, around and between said bags are screens 38, 39 and 40 of wire mesh. Secured in one end wall of each filter bag 37 adjacent the top is a grommet 41 which is engaged over a corresponding nozzle tip 42 extending inwardly through the wall of the casing from a manifold 43 into which the pipe 17 already mentioned connects. Along one of its top edges, each filter bag 37 is provided, as best shown in Fig. 5, with a "zipper" or slide closure 45 whereby access can be had to the interior.

In order to adapt a dry cleaning apparatus such as described up to this point to the purposes of my invention, I have made the provisions about to be described.

From Figs. 2, 3 and 4, it will be noted that, within the bottom of each filter, a hollow 46 is set apart by a horizontal partition or diaphragm 47 in which hollow water or other coolant introduced through a pipe 48 is caused to circulate around a baffle 49 before discharge through a pipe 50, the flow being controllable by means of a valve 51 in the pipe 48.

Referring again to Fig. 1, it will be noted that pipes 55 and 56 leading from a suitable source of steam supply (not shown) are connected into the branch pipes 17 and 18 beyond the valves 20 and 21, said pipes 55 and 56 being fitted with shut-off valves 57 and 58 respectively. From Fig. 1, it will be further noted that steam traps conventionally indicated at 59 and 60 are interposed in the drain pipe 26 respectively at opposite sides of the juncture between said pipe and the continuing pipe 29.

*Operation*

In Fig. 1, assume that the dry cleaning machine 10 is running with the filter 11 in use, and with the valves 20, 23 open and the valves 21, 24 and 57 closed. Under these conditions, the solvent is continuously circulated by action of the pump 19, the direction of flow being as indicated by the arrows, i. e., out of the machine 10 through the piping 16, 17 to the filter 11, and from the latter through the piping 22, 25 back to the machine. At the same time, the other filter 12 is being drained and its filter bags steam stripped. The draining is allowed to take place by gravity from the filter 12 through the piping 26 and 29 into the still 13, and the stripping of the filter bags 37 is accomplished by introduction of steam into their tops through the piping 56 and 18, the valves 27 and 57 having been closed and the valves 28 and 58 having been opened. While the steam stripping of the bags 37 in the filter 12 is in progress, coolant is continuously passed through the hollow base of the filter 12, the coolant entering by way of pipe 48 (of which the corresponding valve 51 is open at this time) and leaving by way of the pipe 50. The solvent (which normally fills the filter 12) drains off in a comparatively short time after which the hot dry steam evaporates the remaining solvent from the filter bags 37, the steam with the entrained recovered solvent being condensed on the sides and the bottom of the filter casing by the action of the coolant circulated in the hollow 46, and passes out through the drain pipe 26. In traversing the trap 60 most of the steam is eliminated, while the captured liquid solvent continues on to the still 13 by way of the pipe 29 where it is boiled off, re-condensed and discharged therefrom into the separator and after cooler 14 through pipe 30 for extraction therefrom of any water content which may have been carried along. Finally, the purified recovered solvent is conducted from the separator 14 through the pipe 31 to a sump (not shown) at the bottom of the machine 10 for re-use in the cleaning. After elapse of sufficient time for complete stripping of the bags in the filter 12, the valves 28, 58 and 51 are closed to shut off the supply of steam and coolant to the filter 12. With this accomplished, the cover 36 (Figs. 2 and 3) of the filter 12 is retracted to permit withdrawal of the filter bags 37 for removal of accumulations of filter aid and contaminates therefrom in the usual way, the bags being subsequently replaced and the cover reclosed in readiness for re-use of the filter.

The bags in the filter 11 can be cleaned and stripped in a like manner while the filter 12 is being used with the dry cleaning machine 10, by setting the various valves as shown in Fig. 8, i. e., by closing the valves 20, 23 and 28 and opening the valves 21, 24, 27, 57 and the valve 51 associated with said filter 11. Under these conditions, the solvent will be circulated between the machine 10 and the filter 12 by way of the piping 16, 17, 22 and 25, and the filter 11 will drain through piping 26, and 29 into the still 13. The bags in the filter 11 are stripped, in the meanwhile, by steam admitted through the pipe 55, and the solvent laden steam condensed in the said filter as a result of passage of coolant through the base 46 from the pipe 48 to the pipe 50, the condensate also finding its way to the still 13 through the drain piping 26, 29. After being purified in the still 13, the recovered solvent is conducted, as before, through pipe 30 to the separator 14 for extraction of any water which may have been entrained, and finally from said separator by way of the pipe 31 into the sump at the bottom of the machine 10 for re-use in the dry cleaning. After expiration of the time necessary to insure thorough stripping of the filter 11, the valve 27, the corresponding valve 51 and the valve 57 are closed, the bags withdrawn for removal of the contaminates therefrom, and the bags finally restored in readiness for re-use of said filter with the machine 10 as before.

While the present invention has been described in terms of a specific cleaning machine, it will be understood that the system as hereinafter claimed is applicable to other types of cleaning units. While the preferred embodiment of this invention has been described in some detail, it will be obvious to one skilled in the art that various modifications may be made without departing from the invention as hereinafter claimed.

Having thus described my invention, I claim:

1. In a filter for filtering contaminated chlorinated hydrocarbon solvents such as perchlorethylene or the like, a closed casing with a crosswise partition therein setting apart an upper chamber and a lower chamber; a filter bag suspended in the upper chamber; a nozzle through which the contaminated solvent is normally introduced into the filter bag; an inlet conduit through which the contaminated solvent is normally conducted to the nozzle, having a normally-open valve interposed therein; a steam pipe connected into said conduit beyond the aforesaid valve and having a normally closed interposed valve therein; an outlet conduit at the top of the upper chamber through which the filtered solvent is normally conducted from the filter, having a normally-open valve interposed therein; a drain conduit at the bottom of the upper chamber having a normally closed valve interposed therein; and means operable, upon closing the first mentioned valve and the outlet valve and opening the steam and drain valves, to circulate coolant through the lower chamber for condensation of the steam and the stripped solvent vapor and discharge of the condensates in liquid form through the drain conduit.

2. Dry cleaning apparatus comprising a machine into which the material to be cleaned is placed; a pair of filters each characterized as in claim 1, means for circulating the solvent between the machine and one of the filters during the cleaning while the other filter is idle; a still to which the drainage from the idled filter is conducted in the meanwhile; and a water separator and after cooler to which the vapor from the still is conducted and from which the recovered solvent, after removal of the water therefrom, is conducted to a sump for re-use in the machine.

3. A dry cleaning apparatus including a dry cleaning machine; and a filter, characterized as in claim 1, wherein the inlet and outlet conduits are connected to the machine, and wherein a circulating pump is interposed in said inlet conduit in advance of the point of connection of the steam pipe as considered with regard to the direction of normal flow of the solvent through said inlet conduit.

4. A dry cleaning apparatus including a dry cleaning machine and a filter, characterized as in claim 1, wherein the inlet and outlet conduits are connected to the machine, and wherein a circulating pump is interposed in said inlet conduit in advance of the point of connection of the steam pipe, with regard to the direction of normal flow of the solvent through said inlet conduit, a still to which the recovered solvent and condensate is conducted from the filter during the stripping; and a water separator and after cooler in communication with the filter and from which the recovered solvent alone is conducted into the machine for re-use in the cleaning.

References Cited in the file of this patent
UNITED STATES PATENTS

| | | |
|---|---|---|
| 2,114,776 | Davis | Apr. 19, 1938 |
| 2,574,251 | Dinley | Nov. 6, 1951 |
| 2,656,696 | McDonald | Oct. 27, 1953 |
| 2,660,869 | McDonald | Dec. 1, 1953 |